March 20, 1945.    E. J. MASON    2,371,639
LOCKING SECTIONAL HANDLE
Filed Aug. 2, 1943
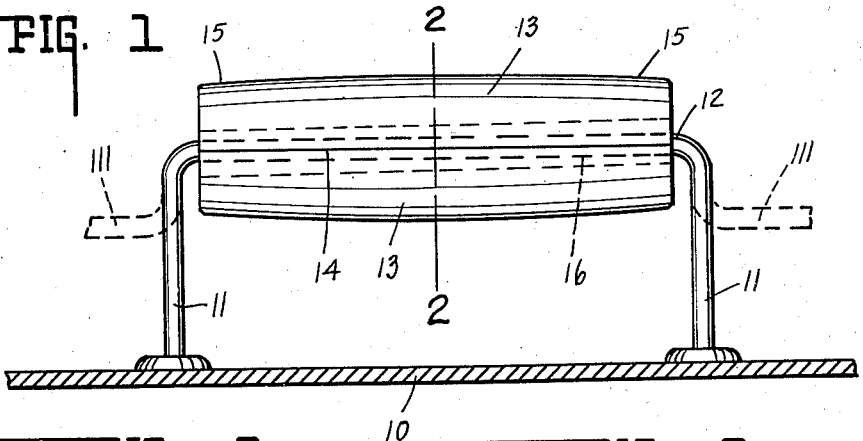
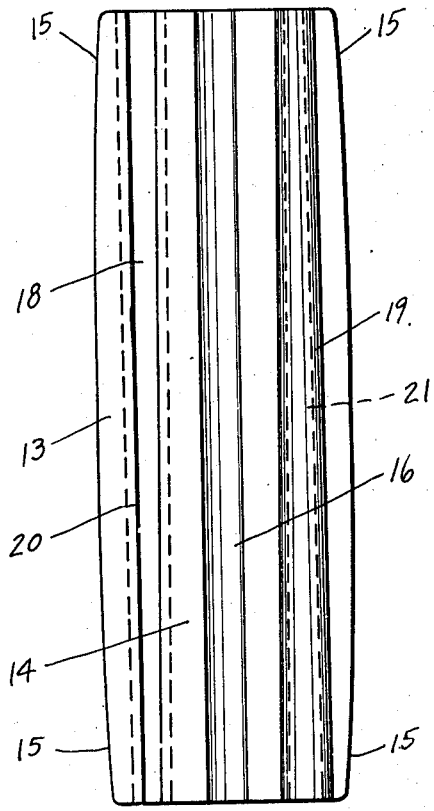
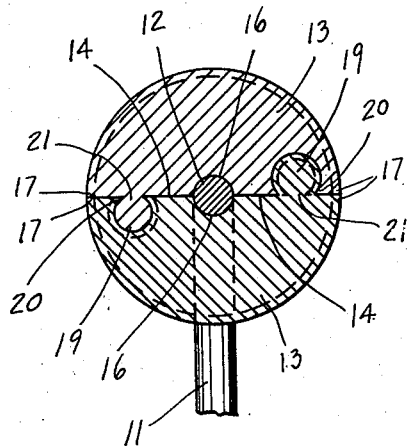
INVENTOR.
ERNEST J. MASON.
BY Lockwood, Goldsmith & Galt,
ATTORNEYS.

Patented Mar. 20, 1945

2,371,639

UNITED STATES PATENT OFFICE 2,371,639

LOCKING SECTIONAL HANDLE

Ernest J. Mason, Marion, Ind.

Application August 2, 1943, Serial No. 497,009

2 Claims. (Cl. 16—125)

This invention relates generally to handles and more especially to handles for tea kettles, coffee pots, pails and other containers having a wire or like bail and upon which is mounted a hand gripping portion termed a handle.

The present invention is an improvement upon that illustrated, described and claimed in Patent No. 2,319,147, dated May 11, 1943. In this patented structure the handle is sectionalized in that it consists of two identical half handles, each having a bail groove, a locking tongue to one side thereof, and a locking groove to the opposite side thereof and spaced a like distance from the bail groove, all grooves and tongues extending longitudinally of the handle, the half handles being assembled upon a bail, or together by end to end telescopic association of the locking tongues and grooves only and from either end.

The present invention is similar, except the half handles cannot be assembled from either end, but only from one end for obvious reasons.

The former handle depended upon friction or on adhesive to prevent longitudinal relative slippage between associated half handles.

The former handle was capable of formation from various materials and readily lent itself to formation in long lengths (subsequently cut to handle length) by extrusion or by routing, etc., if formed from wood or fibre rod stock.

Due to the reentrant character of the neck of the locking tongue and the restricted throat of the locking groove, molding was very slow and expensive and required multiple, collapsible dies, difficult to obtain and expensive to maintain.

The handle of the present invention has as its chief objective, first, the automatic locking together of identical half handles when longitudinally brought together and, second, the rapid molding and ejection of the half handle from a simple die structure. This patentable improvement over the patented handle, accordingly, under present priorities permits the use of phenol-condensation materials (not subject thereto) and which cannot be used in an extrusion device.

The chief feature of the present invention consists in making each of the locking tongues and grooves of said patented identical half handles of longitudinally tapering type which, when longitudinally assembled, wedge lock together, and which, when formed as by molding, may be readily ejected from a partable mold, one part thereof being slidable relative to the other, all as hereinafter pointed out.

Other objects and features of the invention will be set forth more fully hereinafter. Also mention of phenol-condensation material is by way of example only and not one of restriction.

The full nature of the invention will be understood from the accompanying drawing and the following description and claims:

In the drawing,

Fig. 1 is a side elevation of a handle embodying the invention applied to an offset portion of a bail (see dotted lines) or a coffee pot or smoothing iron handle (see full lines).

Fig. 2 is a central sectional view through the handle and handle support.

Fig. 3 is a plan view of one of the identical half handles.

For reasons assigned hereinbefore the patented handle, while quite advantageous and desirable, has certain inherent objections or shortcomings principally in its fabrication in a mold and its non-locking when applied, whereas the present invention, while retaining most of the advantages of such patented handle and eliminating the inherent objections and shortcomings thereof, does not appear capable of fabrication in long units, for subsequent reduction to shorter lengths, as by extrusion or routing, etc.

In Fig. 1, 10 indicates the top shell of a smoothing iron or side wall of a coffee pot and extending therefrom are arms 11 connected by handle supporting portion 12. When used for a pail, bucket or the like, portions 11 may be oppositely directed as at 111 (see dotted lines). This forms a handle locating offset portion in the resulting bail.

Herein the handle proper includes two identical halves with a central plane of contact 14. The exterior may be slightly reduced at opposite ends as at 15. It is for this reason, among others, that the present invention does not readily lend itself to continuous extrusion or reduction fabrication. However, it does lend itself to expeditious repetitious molding production.

Each half handle 13 has a semi-circular cross-sectioned (if desired) median groove 16 extending longitudinally thereof and same nests the bail central portion 12. Midway between the groove 16 and each side edge 17 is a longitudinally directed locking formation, the general direction of which is parallel to the groove 16 and hence parallel to each other. It is not necessary that such formation be equidistant from the side edge and groove 16, but it is essential that the formations be spaced equidistant either from the side edges 17 or the groove 16.

Herein such formations are formed upon the face 14 and are of complementary character, that is one is a groove 18 and the other is a tongue 19. The exact cross-sectional area and/or outline thereof is not essential, except the tongue 19, where it projects from the face 14, has a smaller neck portion 21 than the widest part of the tongue and the locking groove 18 has a throat 20 similarly narrower than the widest part of said groove 18.

Herein such tongues and grooves are almost circular in cross-section. The reentrant character of these formations, as stated, makes difficult the molding of such half handles.

Each of the tongues and grooves is tapered from end to end of the half handle. On the same face 14, however, the tapers are reversed as illustrated in Fig. 3.

Hence, when one half handle 13 is held below portion 12 with same seated in bail groove 16, the other half handle must have its smaller end of the tongue 19 presented to the wider end of the locking groove 18 in the former half handle and vice versa for other cooperating pair of tongue and groove formation. Then the said other handle is slid longitudinally of the said former half handle, movement thereof being limited by portions 11, until the tapered walls of the tongues 19 and grooves 18 frictionally bind. When so bound together, the handle is wedge locked together in place on bail portion 12 and may rotate thereon if desired.

To fabricate such a half handle in the mold structure requires at least a two-part mold, each forming one half of the generally semi-circular exterior and the face 14 with the tapered groove forming core, or the same with the oppositely tapered tongue forming groove. After molding, each mold part may be pulled longitudinally in the direction to free the mold portion from the resulting half handle. This assumes taper 15 is not provided on the handle.

When same is to be embodied, a three-piece mold may be used, the main portion being socketted for forming the desired exterior surface and the other two parts forming the face 14 with groove 16 therein and groove 18 forming core and tongue 19 forming groove. Then these two parts are pulled lengthwise and oppositely thereby exposing face 14. Then a portion in the well of the main mold portion may eject the half handle laterally of said main mold portion. A two-piece mold with half the exterior and half the bore on each part can also be used. Molds of the two-piece and three-piece character suitable for phenol-condensation product molding are well known, hence are not illustrated herein.

For either type of half handle, molding with slip molding portions is required, by reason of the tapered exterior character of said handles and always by reason of the restricted throat 20 and the reduced neck 21, in order to eject the half handle or free it from said mold.

It is to be observed that to connect two identical half handles, it is merely necessary to invert one and then turn it end for end so that the small ends of the tongues confront the large ends of the locking grooves. Then, sliding both together or one on the other with the bail 12 in the resulting complete groove 16 serves to mount and connect the half handles upon the bail and together respectively. Jamming the wedge formations together then locks the parts in these relationships.

While the invention has been illustrated and described in great detail in the drawing and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. A handle for a bail, including two substantially identical half handles, each having a longitudinal bore therethrough, the half handles when associated together forming a complete bore for bail accommodation, each handle at one side of said bore and in the confronting face being provided with a locking tongue parallel to the bore axis and substantially coextensive with the handle, there being a complementary locking groove parallel to the tongue and the bore in that face and spaced equidistant from the bore axis and at the opposite side thereof from said tongue, the tongue of one half handle seating in the locking groove of the other half handle, each locking groove and tongue being longitudinally tapered, the two taperings being oppositely directed in each half handle and identical.

2. A handle for peripheral embracement of and longitudinal locking upon a bail including two substantially identical half handles, each half handle having a face provided with a longitudinal groove positioned midway in that face and extending the full length of the half handle, the grooves when the half handles are faced and locked together forming a bore for bail accommodation, each half handle at one side of said bore forming groove and spaced from said bore and the adjacent longitudinal edge of the face including longitudinally directed tongue means, substantially coextensive with the half handle, said tongue means remote from said face having a greater transverse width than immediately adjacent the face to form a locking tongue thereon, said face having, opposite the tongue and spaced from the bore forming groove a like distant therefrom as the tongue is spaced therefrom, a locking groove parallel to the bore groove and the locking tongue and having a wall arrangement in transverse section substantially complementary to the tongue cross-section, the locking groove being but slightly larger than the tongue for longitudinal slip fit association of the half handles and frictional retention in handle formation about the bail, the locking tongue of one half handle being received by the locking groove of the other half handle and the locking tongue of the last mentioned half handle being received by the locking groove in the said last mentioned one half handle, each locking groove and tongue means being tapered longitudinally, the tapering in each half handle being oppositely directed and identical.

ERNEST J. MASON.